(12) United States Patent
Owens

(10) Patent No.: US 7,363,677 B1
(45) Date of Patent: Apr. 29, 2008

(54) SHOE BRUSH

(76) Inventor: Christopher M. Owens, 1375 Wall St., Waxhaw, NC (US) 28173

( * ) Notice: Subject to any disclaimer, the term of this patent is extended or adjusted under 35 U.S.C. 154(b) by 0 days.

(21) Appl. No.: 11/501,368

(22) Filed: Aug. 9, 2006

(51) Int. Cl.
*A47L 23/00* (2006.01)
(52) U.S. Cl. .................................. 15/161; 280/164.2
(58) Field of Classification Search ............... 15/112, 15/161, 237; 280/164.2
See application file for complete search history.

(56) References Cited

U.S. PATENT DOCUMENTS

| | | | | |
|---|---|---|---|---|
| 154,715 | A * | 9/1874 | Reed | 15/112 |
| 344,733 | A * | 6/1886 | Goldthwait | 15/112 |
| 867,028 | A * | 9/1907 | Frisch | 15/112 |
| 955,769 | A * | 4/1910 | Dahlfues | 15/112 |
| 2005/0005384 | A1* | 1/2005 | Finley | 15/161 |

* cited by examiner

*Primary Examiner*—Mark Spisich

(57) ABSTRACT

A shoe brush is disclosed. An illustrative embodiment of the shoe brush includes a hitch bar, a brush unit provided on the hitch bar and at least one brush provided on the brush unit.

9 Claims, 7 Drawing Sheets

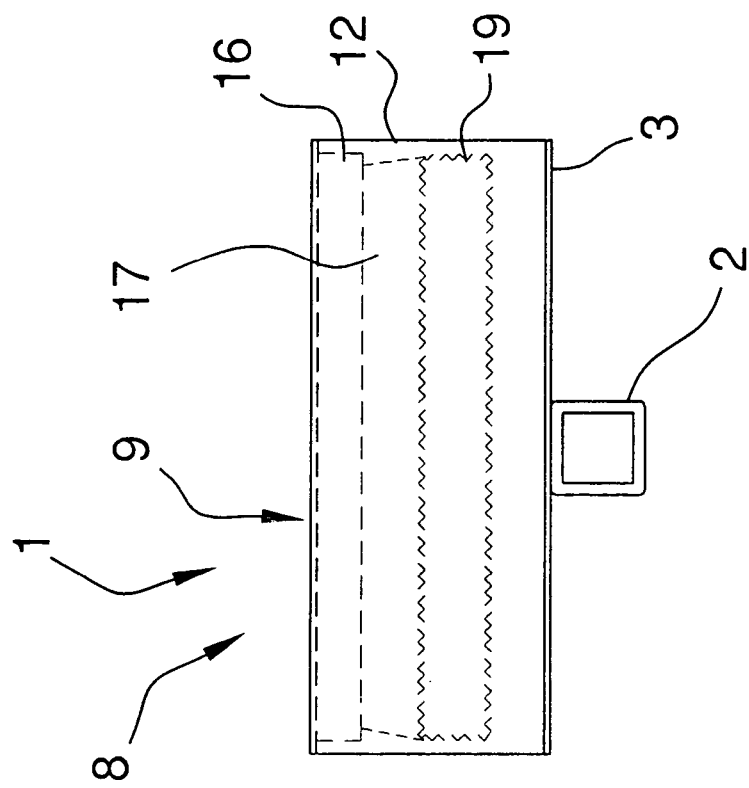
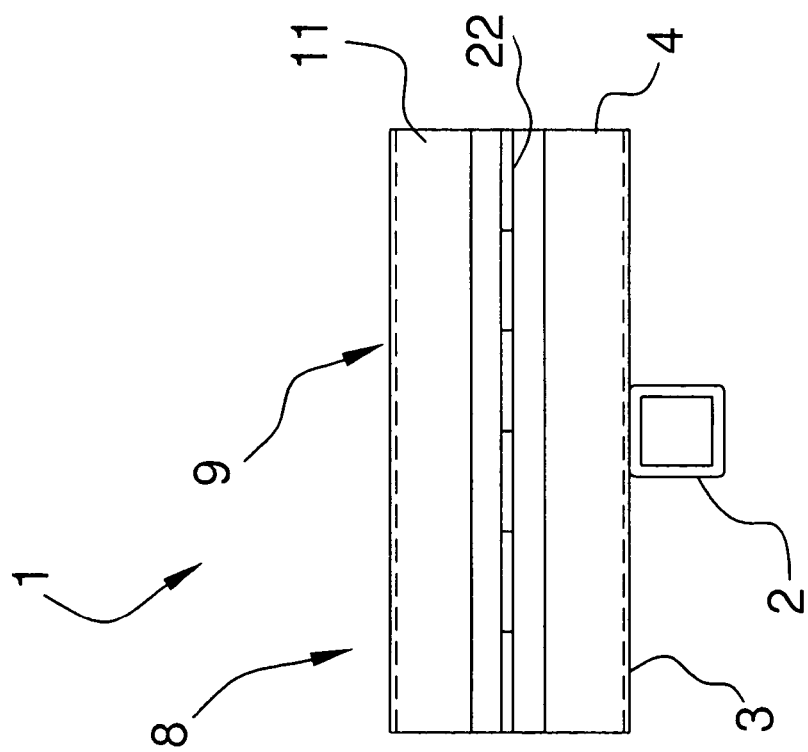

SHOE BRUSH

FIELD

The present invention relates to shoe cleaning devices. More particularly, the present invention relates to a shoe brush which can be fitted to a vehicle to facilitate cleaning of shoes.

BACKGROUND

In many outdoor pursuits, such as hiking, camping and golfing, for example, the shoes of a participant become soiled with dirt, mud, grass, packed snow and the like which can soil the interior of a vehicle if not removed from the shoes first. Therefore, various hand-held brushes and the like are known for cleaning mud and the like from shoes. These brushes, however, may be easily displaced and rendered unavailable when needed.

SUMMARY

The present invention is generally directed to a shoe brush. An illustrative embodiment of the shoe brush includes a hitch bar, a brush unit provided on the hitch bar and at least one brush provided on the brush unit.

BRIEF DESCRIPTION OF THE DRAWINGS

The invention will now be described, by way of example, with reference to the accompanying drawings, in which:

FIG. 6 is a rear view of an illustrative embodiment of the shoe brush, deployed in a folded, storage configuration;

FIG. 7 is a front view of an illustrative embodiment of the shoe brush, taken along viewing lines 7-7 in FIG. 5 and deployed in a folded, storage configuration.

DETAILED DESCRIPTION

Figure 1:
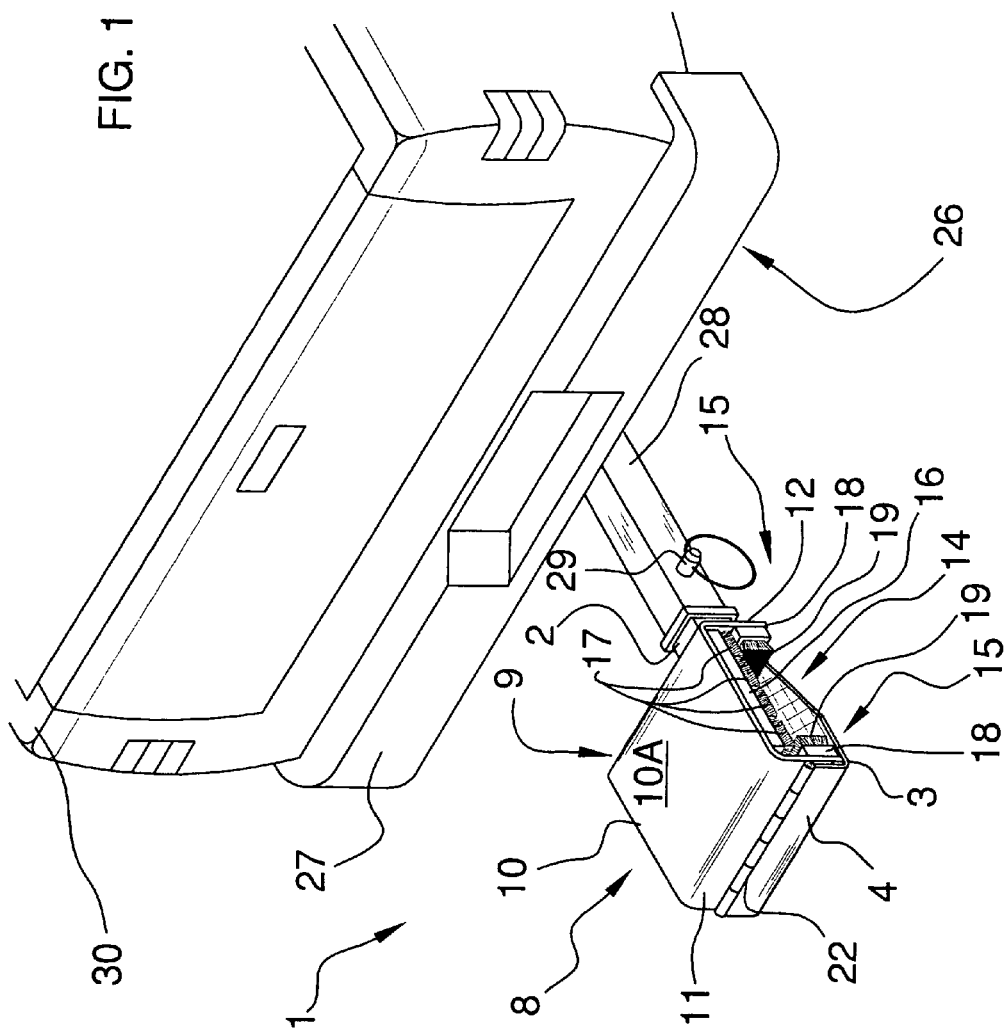
FIG. 1 is a rear perspective view of a vehicle (partially in section), with a hitch bar extending from the vehicle and an illustrative embodiment of a shoe brush attached to the hitch bar and shown in a folded, storage configuration.
Figure 2:
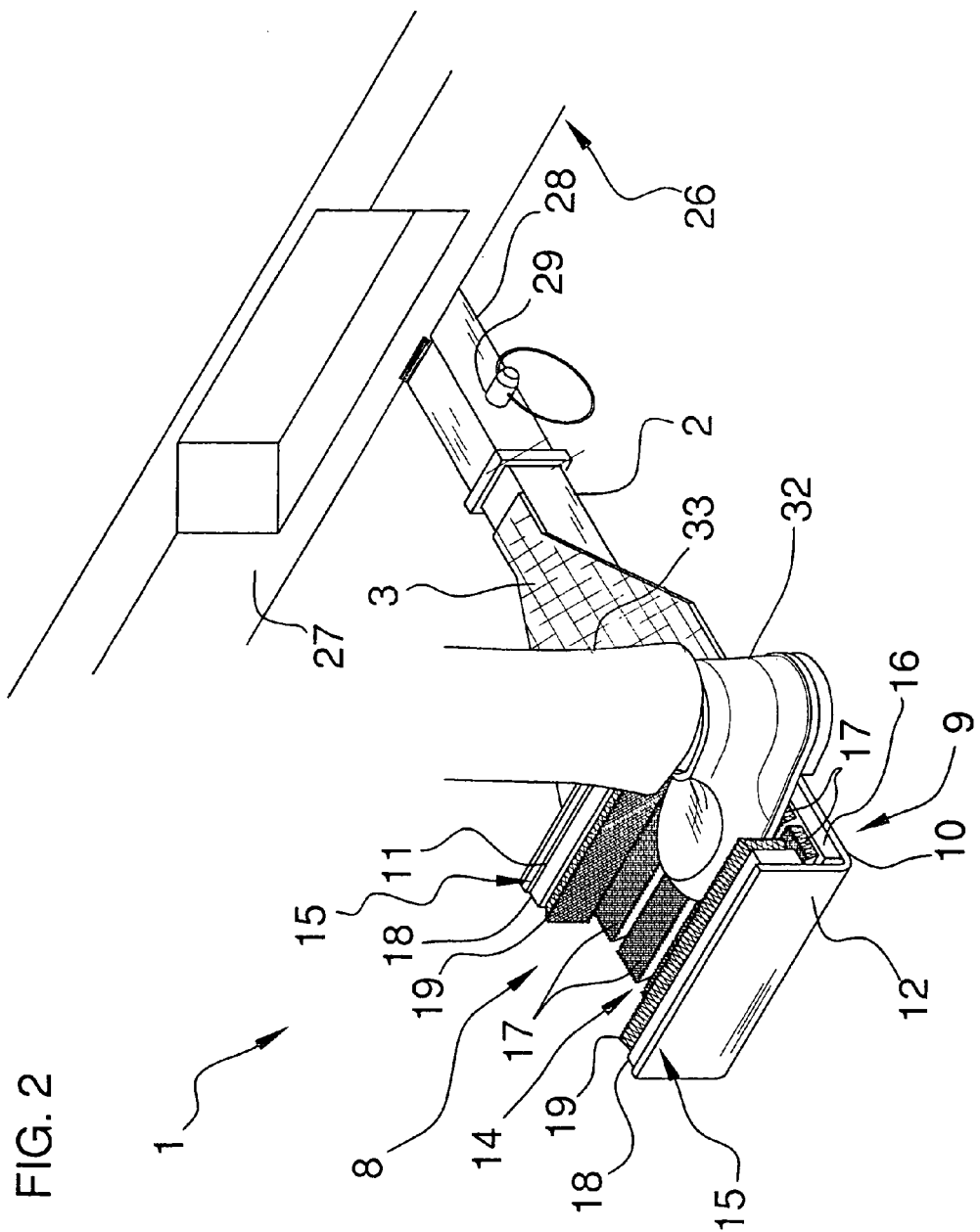
FIG. 2 is a perspective view of an illustrative embodiment of the shoe brush shown in an extended, functional configuration.

Referring to the drawings, an illustrative embodiment of a shoe brush according to the present invention is generally indicated by reference numeral 1. The shoe brush 1 is adapted to be detachably mounted on a hitch receptacle 28 on a vehicle 26. The vehicle 26 may be, for example, a pickup truck having a bed 30, sport utility vehicle (SUV) or any other type of vehicle having a hitch receptacle 28. As shown in FIGS. 1 and 2, the hitch receptacle 28 may be a conventional square tubing hitch receptacle which extends from beneath a rear bumper 27 of the vehicle 26. As will be hereinafter described, the shoe brush 1 is suitable for cleaning a shoe 32 of a user 33, as shown in FIG. 2. In cases in which the vehicle 26 is a pickup truck, the shoe brush 1 may additionally or alternatively be used as a step to assist the user 33 in climbing into the bed 30 of the vehicle 26.

Figure 4:
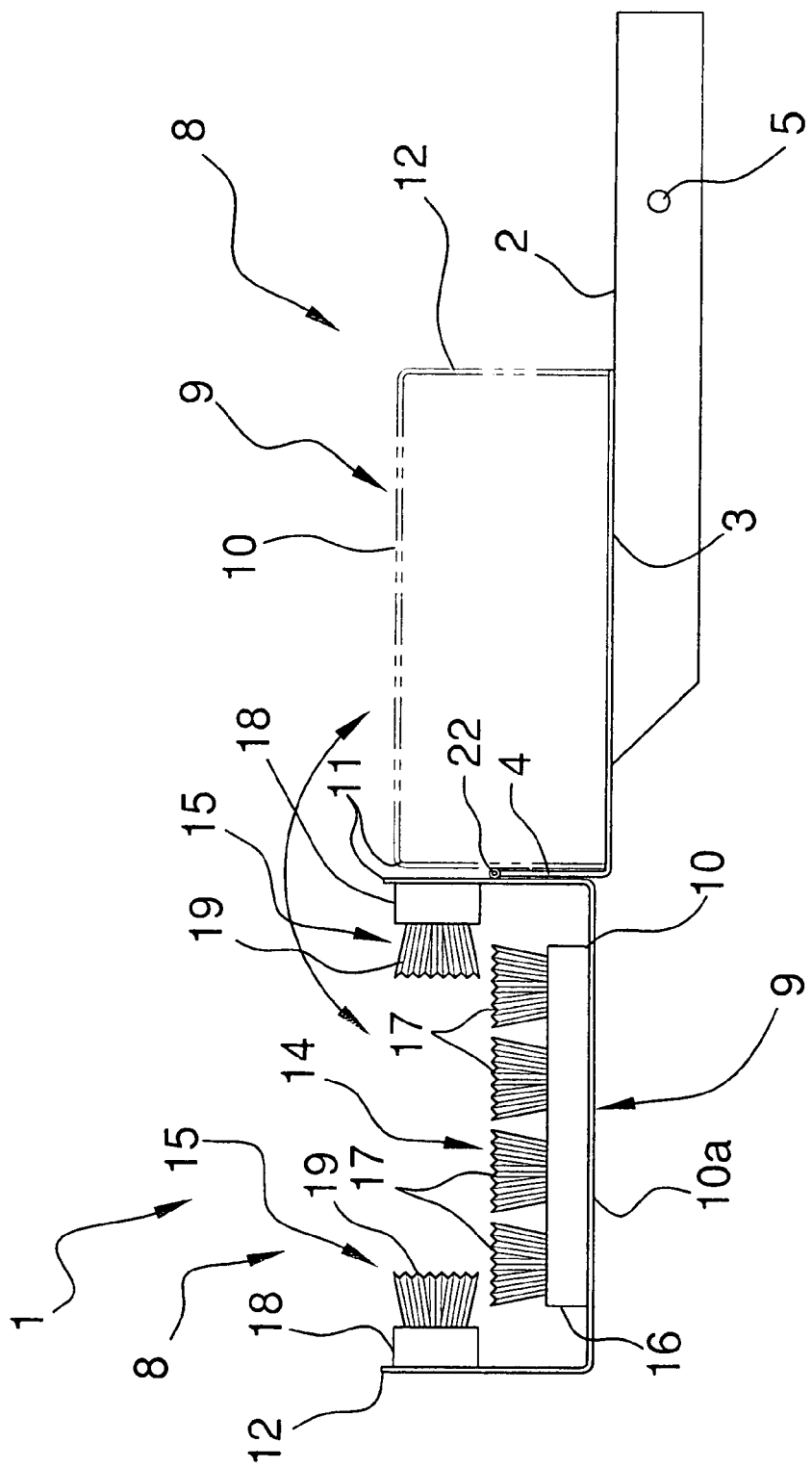
FIG. 4 is a side view of an illustrative embodiment of the shoe brush, illustrating pivoting of the shoe brush between the folded, storage configuration (in phantom) and the extended, functional configuration (shown in solid lines)

The shoe brush 1 includes an elongated hitch bar 2 which may be square tubing, for example. A frame plate 3 is provided on the hitch bar 2. The frame plate 3 may be welded, bolted and/or otherwise attached to the hitch bar 2. As shown in FIG. 4, a plate flange 4 extends upwardly from an edge of the frame plate 3. The plate flange 4 may be disposed at a generally 90-degree angle with respect to the plane of the frame plate 3.

Figure 5:
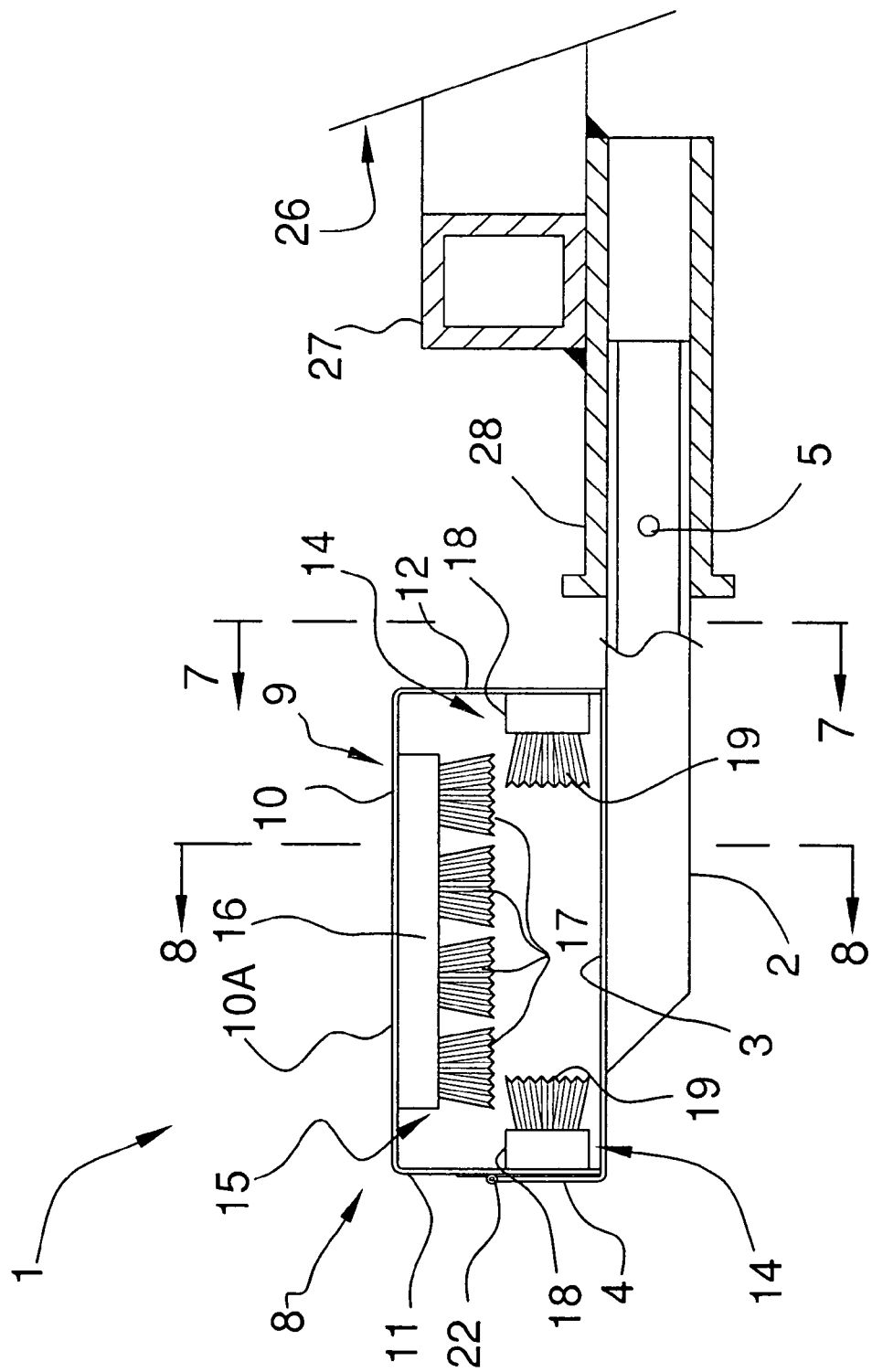
FIG. 5 is a longitudinal sectional view of a hitch bar on a vehicle, with an illustrative embodiment of the shoe brush inserted in the hitch bar and deployed in a folded, storage configuration.
Figure 8:
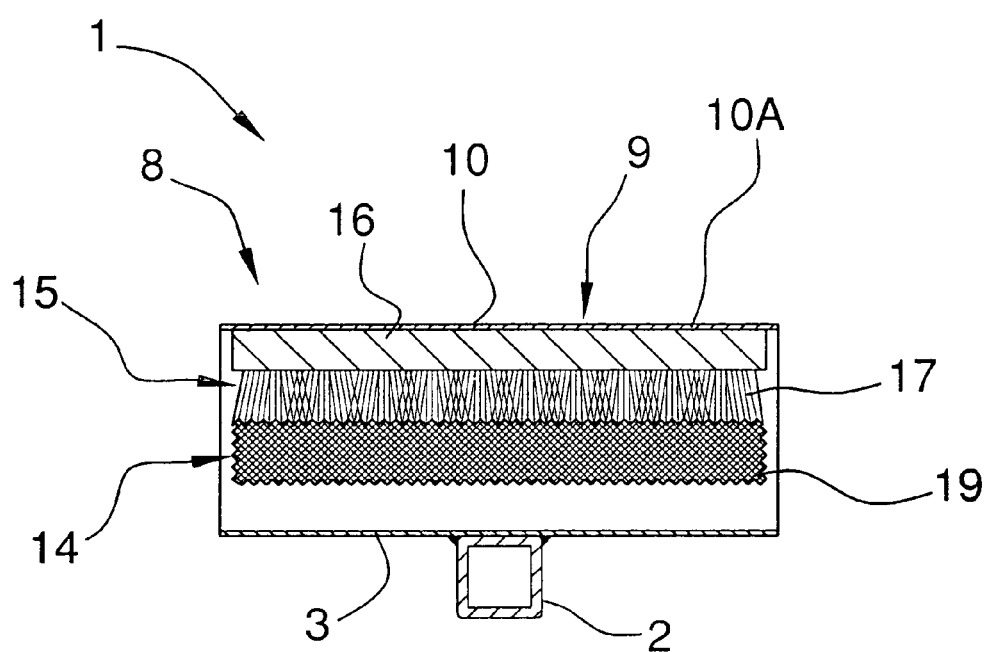
FIG. 8 is a sectional view, taken along section lines 8-8 in FIG. 5, of an illustrative embodiment of the shoe brush, deployed in a folded, storage configuration.

A brush unit 8 is provided on the hitch bar 2. The brush unit 8 may be pivotally attached to the hitch bar 2. As shown in FIGS. 4 and 5, the brush unit 8 may include a brush frame 9 which may be generally channel-shaped, having a generally U-shaped configuration in side view. The brush frame 9 may include, for example, a main panel 10; a proximal flange 11 which extends from one edge of the main panel 10; and a distal flange 12 which extends from the opposite edge of the main panel 10. The proximal flange 11 and the distal flange 12 may each be disposed at a generally 90-degree angle with respect to the plane of the main panel 10. A hinge 22 may pivotally attach the proximal flange 11 of the brush frame 9 to the plate flange 4 of the frame plate 3. Accordingly, the brush unit 8 is pivotal between a folded, storage configuration shown in FIGS. 1 and 5-8 and in phantom in FIG. 4 and an extended, functional configuration shown in FIGS. 2 and 3 and as indicated by the solid lines in FIG. 4. A non-slip traction surface 10a may be provided on the exterior of the main panel 10 of the brush frame 9 for purposes which will be hereinafter described.

Figure 3:
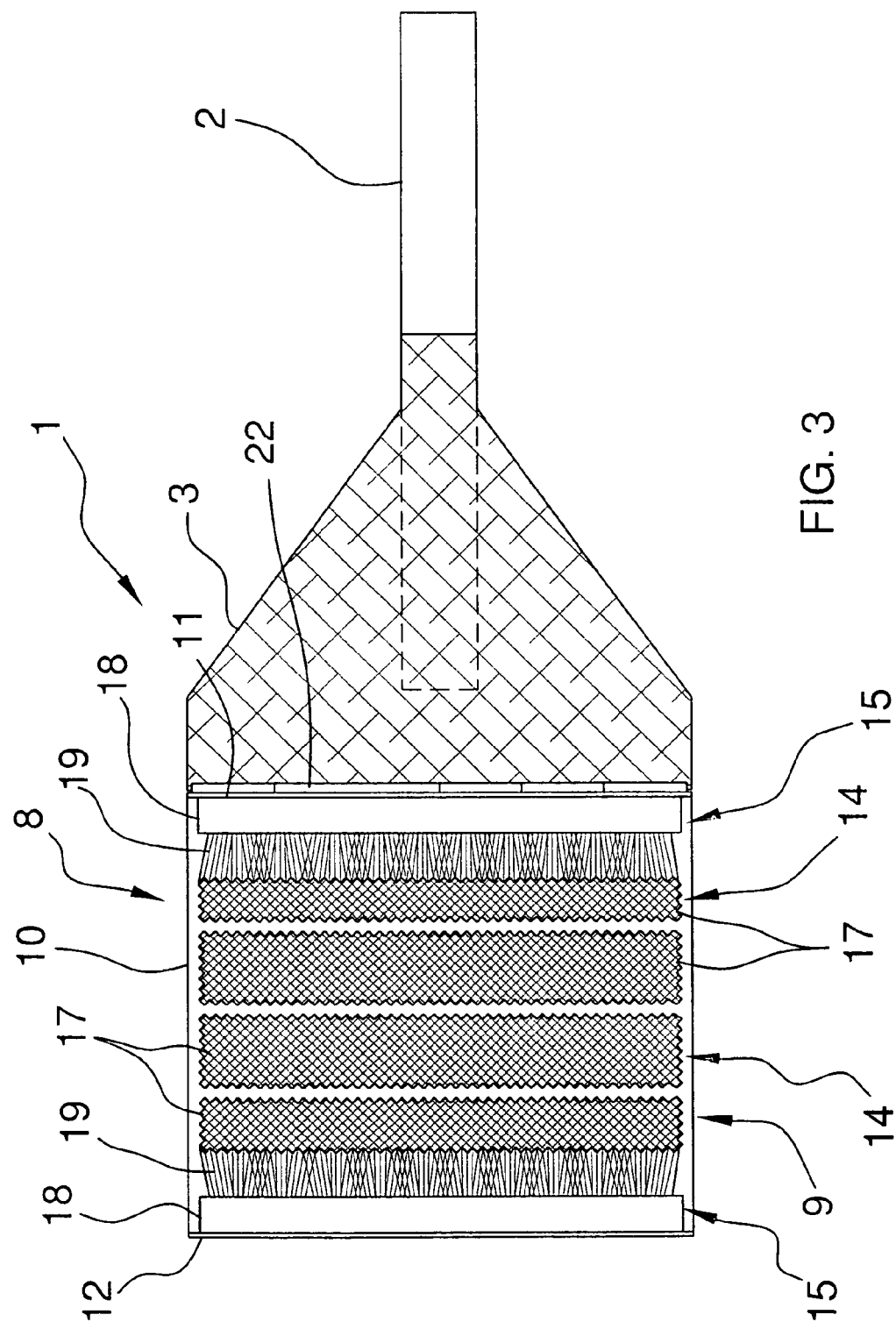
FIG. 3 is a top view of an illustrative embodiment of the shoe brush shown in an extended, functional configuration.

Multiple brushes are provided on the brush frame 9 of the brush unit 8. For example, at least one main brush 14 and at least one side brush 15 may be provided on the brush frame 9. The main brush 14 may include, for example, a main brush base 16 provided on the main panel 10. Multiple main brush bristles 17, which may be any suitable stiff material, extend from the main brush base 16. As shown in FIG. 3, the main brush bristles 17 may be arranged in multiple, elongated rows which are disposed in generally parallel relationship to each other.

Each side brush 15 may include, for example, a side brush base 18 which is provided on each of the proximal flange 11 and the distal flange 12. Multiple side brush bristles 19, which may be any suitable stiff material, extend from the side brush base 18. As shown in FIG. 4, the side brush bristles 19 of the side brush 15 provided on the proximal flange 11 and the side brush bristles 19 of the side brush 15 provided on the distal flange 12 extend toward each other. The main brush bristles 17 of the main brush 14 extend in generally perpendicular relationship to the side brush bristles 19 of each of the side brushes 15.

In typical use, the shoe brush 1 is attached to the hitch receptacle 28 of the vehicle 26 to facilitate cleaning of a shoe 32 worn by a user 33, as shown in FIG. 2. Alternatively or additionally, the shoe brush 1 may be used as a step to facilitate climbing of the user 33 into the bed 30 of the vehicle 26 when the vehicle 26 is a pickup truck. As shown in FIG. 5, the hitch bar 2 of the shoe brush 1 is initially inserted in the hitch receptacle 28 on the vehicle 26. A hitch pin 29 is inserted through pin openings (not shown) provided in opposite sides of the hitch receptacle 28 and registering pin openings 5 provided in opposite sides of the hitch bar 2. When the shoe brush 1 is not in use, such as, for example, when the vehicle 26 is being driven, the brush unit 8 is typically deployed in the folded, storage configuration shown in FIGS. 1 and 5-8 and in phantom in FIG. 4. When use of the shoe brush 1 is desired, the brush frame 9 of the brush unit 8 is pivoted on the hinge 22 to the extended, functional configuration shown in FIGS. 2 and 3 and as indicated by the solid lines in FIG. 4. Therefore, the brush unit 8 is positioned to facilitate cleaning of dirt, mud, grass, packed snow and the like from the shoe 32 of the user 33. As shown in FIG. 2, the user places the shoe 32 on the main brush bristles 17 of the main brush 14 and moves the shoe 32 in a back-and-forth motion. Thus, the main brush bristles 17 of the main brush 14 remove the dirt, mud, grass, packed snow and the like from the bottom of the shoe 32, whereas the side brush bristles 19 of the side brush 15 contact the sides of the shoe 32 and remove the dirt, mud, grass, packed snow and the like from the side portions of the shoe 32.

The brush unit 8 can additionally or alternatively be used as a step to enable the user 33 to climb into the bed 30 of the vehicle 26 in the event that the vehicle 26 is a pickup truck, by stepping onto the brush unit 8, as shown in FIG. 2. Alternatively, the user can step onto the non-slip traction surface 10a on the main panel 10 of the brush frame 9 when the brush frame 9 is deployed in the folded, storage position. After use, the brush frame 9 of the brush unit 8 may be pivoted back to the folded, storage configuration shown in FIGS. 1 and 5-8 and in phantom in FIG. 4.

While the preferred embodiments of the invention have been described above, it will be recognized and understood that various modifications can be made in the invention and the appended claims are intended to cover all such modifications which may fall within the spirit and scope of the invention.

What is claimed is:

1. A shoe brush, comprising:

a hitch bar;

a frame plate carried by said hitch bar;

a brush unit having a brush frame including a generally planar main panel, a proximal flange carried by said main panel and pivotally attached to an upright portion of said frame plate to rotate said proximal flange to 180° to lay flat against said upright portion of said frame plate so that said brush unit is in an upside down storage position and a distal flange carried by said main panel in spaced-apart relationship to said proximal flange; and at least one brush carried by said brush frame of said brush unit.

2. The shoe brush of claim 1 wherein said brush unit comprises a generally channel-shaped brush frame carried by said frame plate and wherein said at least one brush is carried by said brush frame.

3. The shoe brush of claim 1 wherein said at least one brush is carried by at least one of said main panel, said proximal flange and said distal flange.

4. The shoe brush of claim 1 wherein said at least one brush comprises a main brush carried by said main panel of said brush frame.

5. The shoe brush of claim 1 wherein said at least one brush further comprises at least one side brush carried by at least one of said proximal flange and said distal flange of said brush frame.

6. The shoe brush of claim 1 further comprising a traction surface provided on said main panel of said brush frame.

7. The shoe brush of claim 1 wherein said at least one brush comprises a main brush having a main brush base carried by said main panel of said brush frame and a plurality of main brush bristles extending from said main brush base.

8. The shoe brush of claim 7 wherein said plurality of main brush bristles is arranged in a plurality of generally elongated, parallel, adjacent rows.

9. The shoe brush of claim 8 further comprising a first side brush carried by said proximal flange and a second side brush carried by said distal flange.

* * * * *